US005864622A

United States Patent [19]

Marcus

[11] Patent Number: 5,864,622

[45] Date of Patent: Jan. 26, 1999

[54] SECURE IDENTIFICATION CARD AND METHOD AND APPARATUS FOR PRODUCING AND AUTHENTICATING SAME

[75] Inventor: James R. Marcus, Norwalk, Conn.

[73] Assignee: Pitney Bowes Inc., Stamford, Conn.

[21] Appl. No.: 979,018

[22] Filed: Nov. 20, 1992

[51] Int. Cl.[6] .................... H04L 9/00; H04L 9/30

[52] U.S. Cl. .................... 380/23; 380/24; 380/25; 380/30; 380/51; 380/55; 235/379; 235/380

[58] Field of Search .................... 380/23–25, 30, 380/49, 50, 21, 43, 51, 55; 235/379, 380, 382; 340/825.31, 825.34

[56] References Cited

U.S. PATENT DOCUMENTS

| | | | |
|---|---|---|---|
| 4,663,622 | 5/1987 | Goldman et al. | 340/825.34 |
| 4,893,338 | 1/1990 | Pastor | 380/25 |
| 4,991,205 | 2/1991 | Lemelson | 380/5 |
| 4,995,081 | 2/1991 | Leighton et al. | 380/23 |
| 5,027,401 | 6/1991 | Soltesz | 380/54 |
| 5,097,504 | 3/1992 | Camion et al. | 380/23 |
| 5,131,038 | 7/1992 | Puhl et al. | 380/23 |
| 5,135,569 | 8/1992 | Mathias | 106/22 |
| 5,136,647 | 8/1992 | Haber et al. | 380/49 |
| 5,142,578 | 8/1992 | Matyas et al. | 380/21 |
| 5,157,726 | 10/1992 | Merkle | 380/23 |
| 5,159,635 | 10/1992 | Wang | 380/51 |
| 5,163,091 | 11/1992 | Graziano et al. | 380/25 |
| 5,180,906 | 1/1993 | Yamada | 235/487 |
| 5,189,700 | 2/1993 | Blandford | 380/23 |
| 5,191,613 | 3/1993 | Graziano et al. | 380/25 |
| 5,241,600 | 8/1993 | Hillis | 380/23 |

FOREIGN PATENT DOCUMENTS

| | | | |
|---|---|---|---|
| 0 317 229 | 11/1988 | European Pat. Off. | G07F 7/08 |

OTHER PUBLICATIONS

PhotoTrace in Automatic ID News by Greg Smith Minneapolis.

*Primary Examiner*—Bernarr E. Gregory
*Attorney, Agent, or Firm*—Robert H. Whisker; Ronald Reichman; Melvin J. Scolnick

[57] ABSTRACT

An identification card and method and apparatus for producing and authenticating such an identification card. An object or other entity for which the identification card will evidence identity, status or characteristics is scanned to produce a digital signal which is compressed, encrypted, and coded as a two dimensional barcode or as some other appropriate form of coding, which is incorporated into one portion of the identification card. The image is also printed or otherwise embodied onto another portion of the identification card. A text message maybe appended to the signal before it is encrypted and also printed as plain text on the identification card. In one embodiment the signal representing the image is encrypted using a public key encryption system and the key is downloaded from a center. This key maybe changed from time to time to increase security. To facilitate authentication the corresponding decryption key is encrypted with another key and incorporated on the card. To validate the card the coded message is scanned, decoded, decrypted, expanded and displayed. The card may then be authenticated by comparison of the displayed representation of the image and the displayed text message with the image and text message printed on the card.

31 Claims, 2 Drawing Sheets

SECURE IDENTIFICATION CARD AND METHOD AND APPARATUS FOR PRODUCING AND AUTHENTICATING SAME

BACKGROUND OF THE INVENTION

The subject invention relates to an identification card or similar item which serves as evidence of the identity or status of an object or other entity. More particularly, it relates to an identification card or similar item which has a high degree of security against forgery or tampering, and to methods and apparatus for producing and authenticating such cards.

(As used herein the term "identification card" will preferably refer to an item similar to an identification badge of the type used by businesses to identify their employees, but it is within the contemplation of the subject invention, and as used herein the term "identification card" shall include, without limitation, documents, magnetic disks, CD's, or any other suitable item which-may record an image together with related data and which may be associated with an object or other entity to be identified.)

The identification of objects or other entities is a problem at least as old as history. Isaac, blinded by age, mistakenly relied upon Esau's hairiness to distinguish him from Jacob, while Solomon was forced to threaten to kill a baby in order to identify its mother. History and fiction abounds with tales of letters, tokens, signets and passwords used to identify the bearer, and the consequences which have followed from their loss or forgery.

In modern times the most prevalent solution to this problem is the identification card which serves to establish the identity of the bearer, as well as usually some characteristic, status, or attribute of the bearer. Examples are the employee badge, as noted above, and, most commonly, the driver license. Typically, such identification cards will include a picture of the nominal bearer as well as relevant information in text form.

While identification cards and the like have generally proven useful for the day to day conduct of affairs nevertheless they are still subject to forgery or tampering, and indeed a moderately sized illegal industry exist for the purpose of providing false identification documents.

For applications where a high degree of security of identification is required, efficient techniques have been developed to recognize fingerprints, voice patterns, retinal patterns, or other characteristics of individuals. Such systems are highly successful in uniquely identifying individuals known to the system, but are subject to the disadvantages of requiring highly sophisticated, expensive sensors, which are typically not mobile, and which must be connected to a database which identifies selected individuals in terms of physical characteristics such as fingerprints. Such a database must generally be centrally located, both to protect it from tampering and to facilitate updating. Thus, these sophisticated systems are generally limited to restricting access to secure areas.

As is apparent from the above discussion the most common application of identification cards is to identify persons. However, the problem of identification may extend to a very broad class of objects or other entities. Thus, it may be desirable to be able to establish that a particular item has been inspected, or passed through customs, or was produced by a particular company. Similarly, it may be desirable to have secure evidence of the provenance of an art work, or the pedigree of an animal, or that a person, animal, or plant is free from disease. Such applications, and others which will be apparent to those skilled in the art are within the contemplation of the subject invention.

Perhaps because it relates to information, rather than tangible objects, the identification or authentication of documents or other forms of information has been dealt with perhaps more successfully in the past; usually by use of some form of encryption. Thus, U.S. Pat. No. 4,853,961; for: "Reliable Document Authentication System": to: Pastor; issued: Aug. 1, 1989, discloses a system wherein a document is authenticated by encryption using a public key encryption system. U.S. Pat. No. 4,637,051; to Clark discloses a postage meter having an indicia which is authenticated by encryption. Many other applications of encryption to authenticate information will be known to those skilled in the art.

Thus, it is an object of the subject invention to provide an identification card to identify an object or other entity, which card is secure against tampering and forgery.

BRIEF SUMMARY OF THE INVENTION

The above object is achieved and the disadvantages of the prior art are overcome in accordance with the subject invention by means of a method and apparatus for producing an identification card and for validating that identification card. Apparatus for producing an identification card includes a scanner for producing a first signal representative of an image of the object or other entity to be identified, and a printer responsive to the scanner for printing the image on a first portion of the identification card. The apparatus further includes an encrypter for encrypting a second signal, which is derived, at least in part, from the first signal, and which includes a representation of the image; and a coder for incorporating a coded representation of the encryption of the second signal onto a second portion of the identification card.

Apparatus for validating an identification card so produced includes a reader for reading the coded representation of the second signal from the card, a decoder for decoding the coded representation of the second signal, a decrypter for decrypting the decoded signal, and a display for displaying the representation of the image incorporated in the second signal.

In accordance with the method of the subject invention the object to be identified is scanned to produce the first signal and a printer is controlled by the first signal to print the image of the object on the first portion of the identification card. The second signal, which is derived at least in part from the first signal, and which includes a representation of the image is encrypted and coded and incorporated in the second portion of the identification card.

Once produced the card is then validated by reading the coded representation of the second signal from the identification card, decoding and decrypting the second signal, and controlling a display in accordance with the decrypted second signal to display the representation of the image which is included in the second signal. The displayed representation of the image and the printed image on the first portion of the card are then compared to validate the card, and the printed image is compared to the object to confirm its identity.

In accordance with one aspect of the subject invention the first signal is converted into a digital signal for processing.

In accordance with another aspect of the subject invention the second signal includes a compressed form of the first signal.

(Signal compression is well known to those skilled in the art and, in the case of digital signals, involves the application of a predetermined algorithm to a signal to reduce the number of bytes which must transmitted or processed, while still retaining substantially all of the information represented by the signal.)

In accordance with another aspect of the subject invention the second signal is encrypted using an encryption key $E_i$, for a public key encryption system.

In accordance with still another aspect of the subject invention a decryption key, $D_i$ which correspondences to the key, $E_i$, is encrypted with a second encryption key, $E_1$, for the public key encryption system, and the resulting encrypted decryption key $E_1[D_i]$, is appended to the encrypted second signal prior to incorporation of the second signal into the second portion of the identification card.

In accordance with still another aspect of the subject invention the encrypted second signal is printed on the second portion of the identification card as a two dimensional bar code.

In accordance with yet still another aspect of the second invention the apparatus for validating the identification card stores a decryption key $D_1$, corresponding to key $E_1$ and the decryption of the encrypted second signal includes the step of decrypting the encrypted key, $E_1[D_i]$, using the decryption key, $D_1$, to obtain the decryption key $D_i$, which may then be used to decrypt the encrypted second signal.

In accordance with still another aspect of the subject invention the second signal includes a text message and the text message includes a password which is known to a person who is to be identified by the identification card.

In accordance with still a further aspect of the subject invention the second signal includes a text message which is also printed in plain text form on the first portion of the identification card.

Thus, it can be seen that the subject invention achieves the above stated object by providing a method and apparatus for producing an identification card which includes an image which may be easily compared to the object or other entity whose identity is to be verified, and which is highly resistant to forgery or tampering. Other objects and advantages of the subject invention will be readily apparent to those skilled in the art from consideration of the attached drawings and the detailed description set forth below.

DETAILED DESCRIPTION OF PREFERRED EMBODIMENTS OF THE SUBJECT INVENTION

Figure 1:
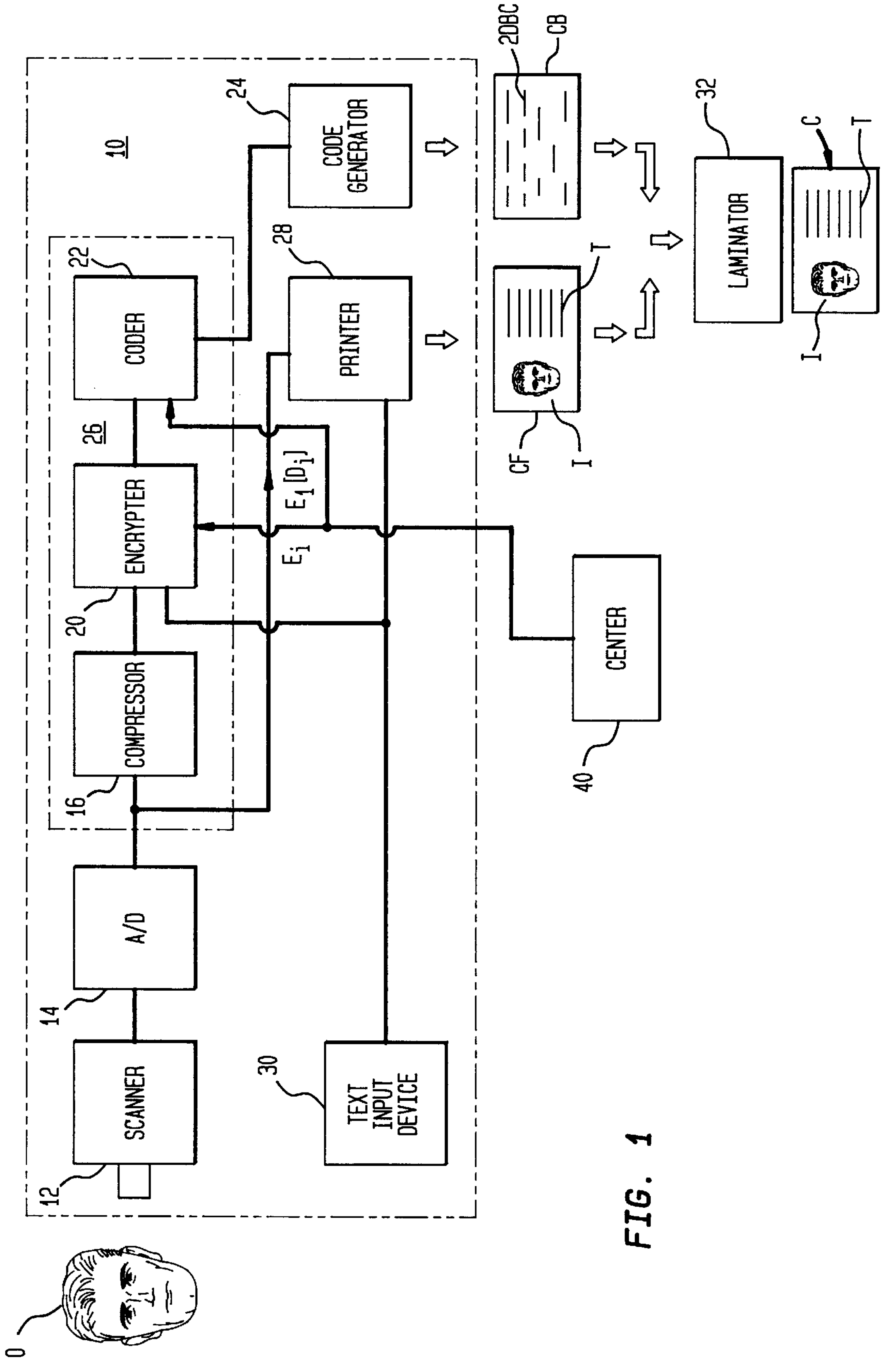
FIG. 1 is a schematic block diagram of an apparatus for producing an identification card in accordance with the subject invention.

FIG. 1 shows a schematic block diagram of apparatus 10 for producing an identification card C. A person (or other object or entity) for whom the identification card is intended is scanned by a conventional video scanner 12 to produce a first signal representative of that person's image. Preferably, the first signal is then converted to a digital form by an analog-to-digital convertor 14 for processing in the digital domain. It is however within the contemplation of the subject invention that at least the signal compression and encryption techniques to be described below may be carried out in the analog domain using signal compression and scrambling technologies well known to those in the analog signal processing arts.

The first signal is then input to a compression module 16 where it is compressed to reduce the amount of data which must be stored on identification card C.

It should be noted that where card C is to have substantially the same form as presently known identification cards, drivers licenses, etc. data compression is, at the present state of technology, necessary. However, with anticipated improvements in data storage technology, or in applications where the identification card may comprise a high capacity storage medium (e.g. a floppy disk), it is within the contemplation of the subject invention that the first signal may not require compression but that the full signal may be processed as will be described further below.

Data compression algorithms, specifically adapted for compression of video image signals, are known to those skilled in the art. Preferably, an algorithm known as the JPEG algorithm, which is known and commercially available is used in compressor 16. Further description of the operation of compressor 16 is not believed necessary to an understanding of the subject invention.

The compressed first signal is then input to an encrypter 20 to be included in the encrypted second signal which will be incorporated into identification card C, as will be described further below. Preferably encrypter 20 encrypts the second signal using an encryption key, $E_i$, for a public key encryption system such as the well known RSA system.

The encrypted second signal is then encoded in accordance with some predetermined format by coder module 22, which controls code generator 24 to incorporate the encoded encrypted second signal in a portion of identification card C.

In accordance with a preferred embodiment of the subject invention the coded signal is coded as a two dimensional barcode, such as the PDF-417 standard barcode, developed by the Symbol Technology Corporation of New York. However, the encrypted second signal may be coded into any suitable format. For example, for a smart card or a memory card coder 22 and code generator 24 may store the coded second signal as an appropriately formatted binary data block.

In the preferred embodiment where the coded second signal is represented as a two dimensional barcode 2DBC the barcode 2DBC will preferably be printed on back CB of identification card C.

In a preferred embodiment of the subject invention compressor module 16, encrypter module 20, and coder module 22 are implemented as software modules in a microprocessor; which is preferably, an Intel model 80386, or equivalent, or higher capacity microprocessor.

The digitized first signal is also input to printer 20 which may use any appropriate technology for the production of identification card C to print an image of the person O on front CF of identification card C. Front CF and back CB are then combined and laminated using well known technology by laminator 32 to produce identification card C.

In accordance with another preferred embodiment of the subject invention text input 30 is used to input a text message. In one embodiment of the subject invention at least a portion of the text message is combined with the compressed form of the first signal to form the second signal which is encrypted by encrypter module 20 and is also printed as plain text on the front CF of card C. Alternatively, text T may be compressed; as for example by deletion of control characters, which are restored in accordance with a predetermined format when text T is recovered, before text T is incorporated into the second signal. Thus, like image I text T is embodied in card C in both human recognizable form on the front CF and coded form on the back CB of card C. In another embodiment the text message may include a password P which would be encrypted and coded but which would not be printed in plain text on front CF.

In a preferred embodiment of the subject invention a center 40 transmits encryption code $E_i$ to encrypter module 20. In order to increase the security of identification card C key $E_i$ maybe changed from time to time. For the highest level of security key $E_i$ maybe changed for each card C produced, or a different key may even be used to encrypt different portions of the second signal.

To facilitate decryption of the second signal in an environment where key $E_i$ is frequently changed center 40 also transmits an encrypted decryption key $E_1[D_i]$ to be appended to the encrypted second signal by coder module 22. Thus, as will be seen below, when card C is to be validated the necessary decryption key $D_i$ can be obtained by decrypting $E_1[D_i]$.

Typically, encryption/decryption pair $E_1$, $D_1$ will remain substantially constant during operation of system 10. However, in applications where system 10 is used to produced identification cards C for various organization different pairs $E_1$ $D_1$ may be used for different organizations.

Figure 2:
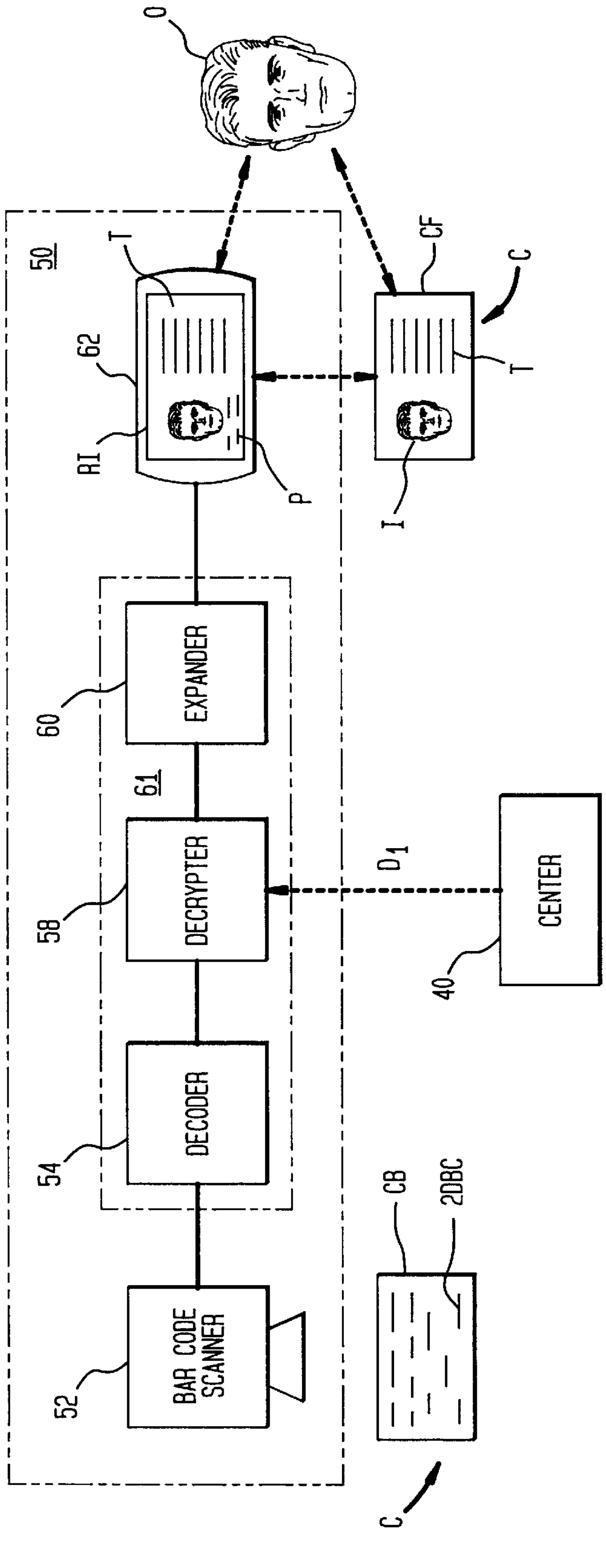
FIG. 2 is a schematic block diagram of an apparatus for validating an identification card produced in accordance with the subject invention.

Turning now to FIG. 2 apparatus 50 for validating an identification card C is shown. The back CB of card C is scanned by a barcode 2DBC scanner 52 having the capability to scan an appropriate two dimensional barcode. The scanned signal is then decoded by decoder module 54 and decrypted by decrypter module 58. In a preferred embodiment of the subject invention decrypter 58 stores decryption key $D_1$ which is used to decrypt encrypted key $E_1[D_i]$ to obtain decryption key $D_i$. Key $D_i$ is then used to decrypt the decoded signal scan from card back CB.

Key $D_1$ is obtained by decrypter 58 from center 40. Typically, $D_1$ will remain constant during operation of system 50, as described above, and a direct communication link between system 50 and center 40 is not necessary and key $D_1$ maybe transmitted in any convenient manner. However, in one application, where identification card C has a predetermined expiration date it may be desirable to change key $D_1$ after the expiration date and if such expiration dates occur sufficiently often a direct communication link to center 40 maybe included in system 50.

The decrypted scan signal is then expanded in by an algorithm complimentary to the compression algorithm used in system 10, in a conventional manner which need not be described further for an understanding of the subject invention.

In a preferred embodiment of the subject invention decoder module 54, decrypter module 58, and expander module 60 maybe implemented as software modules in a microprocessor 61.

The decrypted, expanded signal is then displayed by a conventional display 62. The display includes a representation RI of image I and the text message T which was included in the encrypted second signal scanned from card back CB. The display may also include a password P, which is known to the person O authorized to have card C, but which is not included on card C, as described above. To validate the card image I is compared with its representation RI and the text message T as printed on card C and as shown on display 62 are compared. It should be noted that with compression representation RI will be somewhat degraded with respect to image I. It has been found however that using the above described JPEG algorithm a sufficiently accurate representation of an image of a person's face maybe coded as approximately 1,000 bytes of data and printed using the above described PDF-417 two dimensional barcode in an area of approximately 2.50 by 1.75 inches on the back of a substantially conventional wallet sized card. Of course, as described above, with improvements in storage technology and/or the use of media having a higher data storage capacity as embodiments of identification cards C representation RI can be arbitrarily close to image I.

In an embodiment incorporating a password, password P is shown on display 62 but, of course, is not printed on card front CF. Password P is known to person O authorized to have possession of Card C. Once card C is validated by comparison of image I and text message T printed on card front CF with representation RI and the text message T as shown on display 62 then the identity of the person O carrying card C maybe confirmed by comparison of person O with image I, as well as testing person O for knowledge of password P. Text message T will then confirm the identity of person O and may also confirm the status or characteristics of person O.

The preferred embodiments described above have been given by way of example only, and other embodiments of the subject invention will be apparent to those skilled in the art from consideration of the detailed descriptions set forth above and the attached drawings. Accordingly, limitations on the subject invention are to be found only in the claims set forth below.

What is claimed is:

1. An identification card, comprising:

a) a first portion comprising a visible image of an object or other entity to be identified by said identification card; and b) a second portion comprising a scannable two dimensional barcode representation of a signal comprising a compressed and encrypted representation of said image wherein a decryption key, $D_i$, corresponding to said encryption key, $E_i$, is encrypted with a second encryption key, $E_1$, for said public key encryption system to produce an encrypted description key, $E_i[D_i]$, and said encrypted decryption key, $E_1E_i$, is appended to said digital signal prior to incorporation into said second portion.

2. An identification card as described in claim 1 wherein said signal is a digital signal.

3. An identification card as described in claim 2 wherein said digital signal comprises a compressed signal derived from a scan signal produced by scanning s aid object or other entity.

4. An identification card as described in claim 3 wherein said digital signal is encrypted using an encryption key, $E_i$, for a public key encryption system.

5. A method of identifying an object, or other entity comprising the steps of:

a) scanning said object or other entity to produce a first signal representative of an image of said object or other entity;

b) printing said image on a first portion of an identification card;

c) compressing said first signal to generate a second signal comprising a compressed representation of said image;

d) encrypting said second signal;

e) encoding said encrypted second signal as a two dimensional barcode to provide a coded representation thereof, and incorporating said coded representation of said encrypted second signal into a second portion of said identification card;

f) reading said coded representation of said second signal from said identification card;

g) decoding said second signal;

h) decrypting said decoded second signal;

i) expanding said decrypted second signal to obtain an expanded representation of said image;

j) inputting said expanded second signal to a display to display said expanded representation of said image;

k) comparing said printed image to said displayed representation to validate said card; and l) comparing said printed image to said object or other entity to identify said object or other entity.

6. A method as described in claim 5 further comprising converting said first signal into a digital signal.

7. A method as described in claim 6 where said second signal is encrypted using an encryption key, $E_i$, for a public key encryption system.

8. A method as described in claim 7 wherein a decryption key, $D_i$, corresponding to said encryption key, $E_i$, is encrypted with a second encryption key, $E_1$, for said public key encryption system.

9. A method as described in claim 8 wherein said encrypted decryption key, $E_1[D_i]$, is appended to said encrypted second signal prior to incorporation into said second portion.

10. A method as described in claim 2 wherein decryption of said encrypted second signal comprises the further steps of decrypting said encrypted key, $E_1[D_i]$ using a decryption key, $D_1$.

11. A method for producing an identification card, comprising the steps of:

a) scanning an object or other entity to produce a first signal representative an image of said object or other entity;

b) printing said image on a first portion of said identification card;

c) compressing said first signal to generate a second signal comprising a compressed representation of said image;

d) encrypting said second signal;

e) encoding said encrypted second signal as two dimensional barcode to provide a coded representation thereof, and incorporating said coded representation of said encrypted second signal into a second portion of said identification card.

12. A method as described in claim 11 further comprising converting said first signal into a digital signal.

13. A method as described in claim 12 where said second signal is encrypted using an encrypted key, $E_i$, for public key encryption system.

14. A method as described in claim 13 wherein a decryption key, $D_i$, corresponding to said encryption key, $E_i$, is encrypted with a second encryption key, $E_1$, for said public key encryption system.

15. A method as described in claim 14 wherein said encrypted decryption key, $E_1[D_i]$, is appended to said encrypted second signal prior to incorporation into said second position.

16. Apparatus for producing an identification card, comprising:

a) scanning means for producing a first signal representative of an image of an object or other entity to be identified by said identification card;

b) printing means, responsive to said scanning means, for printing said image on a first portion of said identification card;

c) compressing means for compressing said first signal to generate a second signal comprising a compressed representation of said image;

d) encrypting means for encrypting said second signal;

e) coding means for incorporating a two dimensional barcode representation of said of said encrypted second signal into a second portion of said identification card.

17. Apparatus as described in claim 16, further comprising an analog-to-digital converter for converting said first signal into a digital signal.

18. Apparatus as described in claim 17 further comprising means for encrypting said second signal using an encryption key, $E_i$, for a public key encryption system.

19. Apparatus as described in claim 18 wherein a decryption key, $D_i$, is encrypted with a second key, $E_1$, and said encrypted decryption key, $E_1[D_i]$, is appended to said encrypted second signal prior to incorporation into said second portion.

20. Apparatus as described in claim 18 further comprising means for receiving said encryption key, $E_i$, and said encrypted decryption key, $E_1[D_i]$, from a central station.

21. A method for validating an identification card, said card having an image of an object or other entity to be identified on a first portion and a two dimensional barcode representation of an encrypted signal comprising a compressed representation of said image incorporated on a second portion of said card, comprising the steps of:

a) reading said barcode representation of said signal from said card;

b) decoding said barcode representation of said signal;

c) decrypting said decoded signal;

d) expanding said decrypted signal to obtain an expanded representation of said image;

e) inputting said expanded signal to a display to display said expanded of said image; and e) validating said card by comparison of said image on said first portion of said card with said displayed representation.

22. A method as described in claim 21 wherein said encrypted signal is encrypted using an encryption key, $E_i$, for a public key encryption system.

23. A method as described in claim 22 wherein a decryption key, $D_i$ corresponding to said key $E_1$, is encrypted with a second encryption key $E_1$ for said public key encryption system to form an encrypted decryption key, $E_1[D_i]$, and said encrypted decryption key, $E_1[D_i]$ is appended to said encrypted signal, and wherein said decryption step further comprises the steps of:

a) decrypting said encrypted decryption key, $E_1[D_i]$ with a corresponding decryption key, $D_1$, to recover said decryption key $D_i$; and, b) decrypting said encrypted signal with said key, $D_i$.

24. Apparatus for use in validating an identification card, said card having an image of an object or other entity to be identified on first portion and a two dimensional barcode representation of an encrypted signal comprising a compressed representation of said image incorporated in a second portion of said card, comprising:

a) means for reading said barcode representation of said signal from said card;

b) decoding means, responsive to said reading means for decoding said barcode representation of said signal;

c) decrypting means, responsive to said decoding means, for decrypting said decoded signal;

d) expanding means, responsive to said decrypting means, for expanding said decrypted signal to obtain an expanded representation of said signal; and, e) display means, responsive to said expanding means, for displaying said expanded representation of said image.

25. An apparatus as described in claim 24 wherein said encrypted signal is encrypted using an encryption key, $E_i$, for a public key encryption system.

26. Apparatus as described in claim 25 wherein a decryption key, $D_i$, corresponding to said key $E_i$, is encrypted with an encryption key $E_1$ for said public key encryption system to form an encrypted decryption key $E_1[D_i]$, and said encrypted decryption key $E_1[D_i]$ is appended to said encrypted signal, and said decrypting means further comprises:

a) means for decrypting said encrypted decryption key, $E_1[D_i]$ with a corresponding decryption key, $D_1$, to recover said decryption key, $D_i$; and b) means for decrypting said encrypted signal using said key, $D_i$.

27. A method of identifying an object or other entity comprising the steps of:

(a) scanning said object or other entity to produce a first signal representative of an image of said object or other entity;

(b) printing said image on a first portion of an identification card;

(c) generating a second signal comprising a representation of said image and encrypting said second signal, said second signal being derived at least in part from said first signal; wherein, (d) said second signal is encrypted with an encryption key, $E_i$, for a public key encryption system, and a corresponding decryption key, $D_i$, encrypted with a second encryption key $E_1$ for said public key encryption system to form an encrypted decryption key $E_1[D_i]$ is appended to said second signal (e) encoding said encrypted second signal and said encrypted decryption key, $E_i[D_i]$, to provide a coded representation thereof, and incorporating said coded representation into a second portion of said identification card;

(f) reading said coded representation of said second signal and said encrypted decryption key, $E_1[D_i]$ from said identification card;

(g) decoding said encrypted decryption key, $E_1[D_i]$, with a second corresponding decryption key, $D_1$, to obtain decryption key, $D_i$;

(h) decrypting said encrypted second signal with said decryption key, $D_i$;

(i) inputting said decrypted second signal to a display to display said representation of said image;

(j) comparing said printed image to said displayed representation of said image to validate said card; and (k) confirming the identity of said object or other entity by comparing said printed image to said object or other entity.

28. A method for producing an identification card comprising the steps of:

(a) scanning an object or other entity to produce a first signal representative of an image of said object or other entity;

(b) printing said image on a first portion of said identification card;

(c) generating a second signal comprising a representation of said image and encrypting said second signal, said second signal being derived at least in part from said first signal; wherein (d) said second signal is encrypted with an encryption key, $E_i$, for a public key encryption system, and a corresponding decryption key, $D_i$, encrypted with a second encryption key, $E_1$, to form an encrypted decryption key $E_1[D_i]$, is appended to said second signal; and (e) encoding said encrypted second signal and said encrypted decryption key, $E_i[D_i]$, to provide a coded representation thereof, and incorporating said coded representation into a second portion of said identification card.

29. Apparatus for producing an identification card, comprising:

(a) scanning means for producing a first signal representative of an image of an object or other entity to be identified by said identification card;

(b) printing means, responsive to said scanning means, for printing said image on a first portion of said identification card;

(c) generating means for generating a second signal comprising a representation of said image, said second signal being derived at least in part from said first signal;

(d) encrypting means for encrypting said signal with an encryption key, $E_1$, for a public key encryption system;

(e) appending means for encrypting a corresponding decryption key, $D_i$, with a second encryption key, $E_1$, to produce an encrypted decryption key $E_1[D_i]$ and appending said encrypted decryption key $E_1[D_i]$ to said encrypted second signal;

(f) encoding means for encoding said encrypted second signal and said encrypted decryption key, $E_1[D_i]$, to provide a coded representation thereof; and (g) incorporating means for incorporating said coded representation into a second portion of said identification card.

30. Apparatus for use in validating an identification card, said card having an image of an object or other entity to be identified on a first portion, and having a coded representation of a signal encrypted with an encryption key, $E_i$, for a public key encryption system, said signal comprising a representation of said image, together with a corresponding decryption key, $D_i$, for said public key decryption system encrypted with an encryption key, $E_1$, to for an encrypted decryption key $E_1[D_i]$ appended thereto, incorporated on a second portion of said identification card, comprising the steps of:

(a) reading means for reading said coded representation from said card;

(b) decoding means, responsive to said reading means, for decoding said coded representation;

(c) decrypting means, responsive to said decoding means for decrypting said encrypted decryption key, $E_1[D_i]$, and for decrypting said encrypted signal to obtain said representation of said image; and, (d) display means, responsive to said decrypting means for displaying said representation of said image; whereby, (e) said card may be validated by comparison of said image on said first portion of said card with said displayed representation of said image.

31. A method of validating an identification card, said card having an image of an object or other entity to be identified on first portion, and having a coded representation of a signal encrypted with an encryption key, $E_i$, for a public key encryption system, said signal comprising a representation of said image, together with a corresponding decryption key $D_i$ for said public key decryption system encrypted with an encryption key, $E_1$, to form an encrypted decryption key, $E_1[D_i]$, appended thereto, incorporated on a second portion of said identification card, comprising the steps of:

(a) reading said coded representation from said card;

(b) decoding said coded representation (c) decrypting said encrypted decryption key $E_1[D_i]$ to obtain said decryption key, $D_i$;

(d) decrypting said encrypted signal with said decryption key, $D_i$; to obtain said representation of said image;

(e) inputting said representation of said image to a display to produce a displayed image; and (f) making a comparison of said displayed image with said image on said first portion and determining the validity of said card on the basis of said comparison.

* * * * *